US006330487B1

(12) United States Patent
Jahn et al.

(10) Patent No.: US 6,330,487 B1
(45) Date of Patent: Dec. 11, 2001

(54) COMPUTERIZED VIRTUAL PAINT MANUFACTURING AND APPLICATION SYSTEM

(76) Inventors: Raimar A. Jahn, 30573 Hunstman Dr., Farmington Hills, MI (US) 48331; Edward A. Guerrini, 33922 Oakland, Farmington, MI (US) 48335; Paul E. Lamberty, 245 Chandler, Romeo, MI (US) 48065; Christopher T. Dine, 527 Sunset, White Lake, MI (US) 48383; Aimee Barach, 1915 N. Washington, Apt. #2, Royal Oak, MI (US) 48073; Kai Long, An der alten Kirche 53, 48165 Münster (DE); Dirk Nimphius, Dondersring 11, 48151 Münster (DE); Jürgen Pitzer, Bernwardring 33, 59387 Ascheberg (DE)

( * ) Notice: Subject to any disclaimer, the term of this patent is extended or adjusted under 35 U.S.C. 154(b) by 0 days.

(21) Appl. No.: 09/471,713

(22) Filed: Dec. 23, 1999

Related U.S. Application Data

(63) Continuation of application No. 08/966,960, filed on Nov. 10, 1997, now Pat. No. 6,073,055.

(51) Int. Cl.[7] .............................. G06F 19/00; G06F 17/30
(52) U.S. Cl. .............................. 700/97; 700/117; 118/696
(58) Field of Search ................................ 700/26, 117, 32, 700/24, 29, 27, 97, 28, 83, 123, 239, 180; 707/104; 702/130, 170; 324/716, 176; 356/355; 401/24, 29, 44; 118/696

(56) References Cited

U.S. PATENT DOCUMENTS

| | | | | |
|---|---|---|---|---|
| 4,525,071 | * | 6/1985 | Horowitz et al. | 54/1 |
| 4,593,360 | * | 6/1986 | Cooks | 700/123 |
| 4,705,083 | * | 11/1987 | Rossetti | 141/104 |
| 5,083,591 | * | 1/1992 | Edwards et al. | 141/9 |
| 5,504,695 | * | 4/1996 | Yoshida et al. | 702/170 |
| 5,689,415 | * | 11/1997 | Calotychos et al. | 700/67 |
| 5,886,894 | * | 3/1999 | Rakoff | 700/3 |
| 6,064,919 | * | 5/2000 | Slusarczyk | 700/117 |

* cited by examiner

Primary Examiner—Paul P. Gordon

(57) ABSTRACT

A computer-implemented apparatus and method for coordinating paint-related process steps of at least one paint-related facility. The paint-related process steps exhibit paint-related characteristics. A data acquisition module is provided for acquiring paint characteristic data indicative of the paint-related characteristics. A paint process control data structure is provided for interrelating the acquired paint characteristic data with at least two of the paint-related process steps to produce interrelated paint process control data. A paint process control coordinator is connected to the data acquisition module for storing the acquired paint characteristic data in the paint process control data structure. A data display is connected to the paint process control data structure for remotely receiving and viewing the interrelated paint process control data.

14 Claims, 20 Drawing Sheets

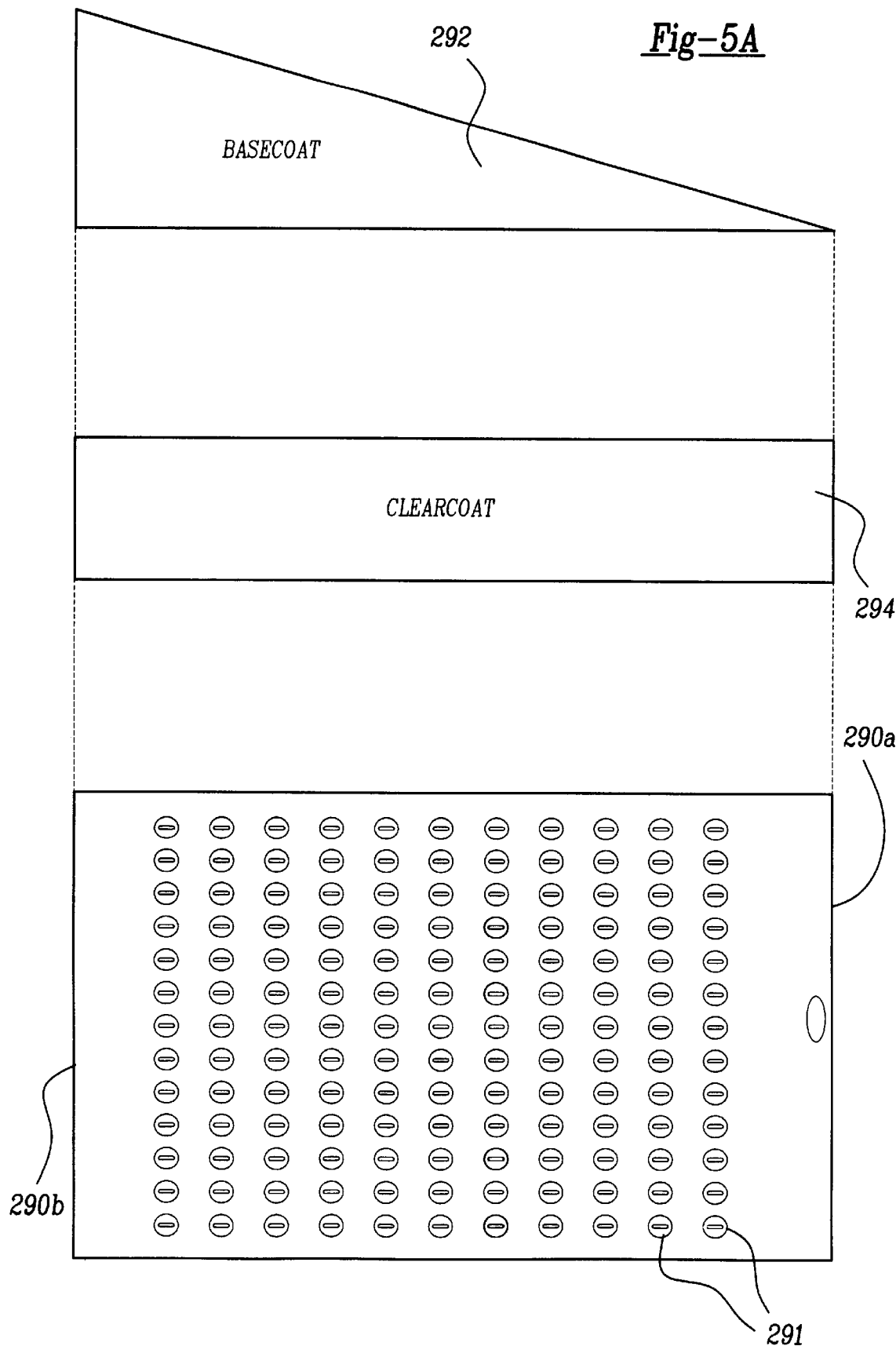

Fig-6A

_Fig-9_

| PAINT MANUFACTURING DATA STRUCTURE | | | CORE PROCESS STEPS | | | | | | | | | |
|---|---|---|---|---|---|---|---|---|---|---|---|---|
| | | | BATCH PRODUCTION | | | | | | | | | |
| | | | MATERIAL RECEIPT | MATERIAL STORAGE | STAGING OF MATERIALS | EQUIPMENT PREPARATION | RAW MATERIAL TRANSFER | INTERMEDIATE PROCESSING | BATCH BLENDING | BATCH ADJUSTMENT | FILLING PROCESS | EQUIPMENT CLEANING PROCESS | PRODUCT STORAGE | PRODUCT DELIVERY |
| SITE INFORMATION | | | | | | | | | | | | |
| CAPACITY | % FIRST RUN RATING | | | | | | | | | | | |
| PRODUCTION FIGURES | WATER | | | | | | | | | | | |
| | ENERGY | | | | | | | | | | | |
| | AIR | | | | | | | | | | | |
| | EMISSIONS | | | | | | | | | | | |
| NUMBER OF EMPLOYEES | | | | | | | | | | | | |
| JOBS | | | | | | | | | | | | |
| EQUIPMENT | EQUIPMENT | | | | | | | | | | | |
| | ACCESSORIES | | | | | | | | | | | |
| | CONFIGURATION | | | | | | | | | | | |
| PROCESS | ENVIRONMENTAL PARAMETERS | | | | | | | | | | | |
| | CONSTANT PARAMETERS | | | | | | | | | | | |
| | VARIABLE PARAMETERS | | | | | | | | | | | |
| | PRODUCT INFORMATION | | | | | | | | | | | |
| RAW MATERIAL | MATERIAL DATA | | | | | | | | | | | |
| | MATERIAL INFORMATION | | | | | | | | | | | |
| | MATERIAL PARAMETERS | | | | | | | | | | | |
| | CONSUMPTION | | | | | | | | | | | |
| QUALITY FORWARD | TESTS | | | | | | | | | | | |
| | EVALUATION | | | | | | | | | | | |
| QUALITY BACKWARD | 1 IN-PROCESS BATCH CONTROL | | | | | | | | | | | |
| | DEFECT-KIND/TYPE | | | | | | | | | | | |
| | 2 QUANTIFICATION | | | | | | | | | | | |
| | EVALUATION | | | | | | | | | | | |
| | PROBLEM DESCRIPTION | | | | | | | | | | | |
| | INTERIM CONTAINMENT ACTIONS | | | | | | | | | | | |
| | POTENTIAL CAUSE(S) IDENTIFICATION | | | | | | | | | | | |
| | 3 ROOT CAUSE IDENTIFICATION | | | | | | | | | | | |
| | VERIFICATION OF CORRECTIVE ACTIONS | | | | | | | | | | | |
| | PERMANENT CORRECTIVE ACTIONS | | | | | | | | | | | |
| | PREVENTATIVE ACTIONS | | | | | | | | | | | |
| PEOPLE | STANDARD TRAINING PROGRAM | | | | | | | | | | | |
| | JOB TITLE | | | | | | | | | | | |
| | JOB DESCRIPTION | | | | | | | | | | | |
| ECONOMY | COST PER KG/GAL | | | | | | | | | | | |
| | YIELD | | | | | | | | | | | |
| | OFF-SPECIFICATION | | | | | | | | | | | |
| | WASTE | | | | | | | | | | | |
| AGREEMENT | WHO DOES WHAT? BASF/SUPPLIER | | | | | | | | | | | |
| | CONTRACT-TIER 2 SUPPLIER | | | | | | | | | | | |

| | | | |
|---|---|---|---|
| SITE INFORMATION | | | |
| CAPACITY | | | |
| PRODUCTION FIGURES | % FIRST RUN RATING | | |
| | WATER | | |
| TYPE OF VEHICLE(S) | ENERGY | | |
| NUMBER OF EMPLOYEES | | | |
| JOBS | AIR | | |
| | EMISSIONS | | |
| EQUIPMENT | EQUIPMENT | | |
| | ACCESSORIES | | |
| | CONFIGURATION | | |
| PROCESS | ENVIRONMENTAL PARAMETERS | | |
| | CONSTANT PARAMETERS | | |
| | VARIABLE PARAMETERS | | |
| MATERIAL | PRODUCT INFORMATION | | |
| | MATERIAL DATA | | |
| | MATERIAL INFORMATION | | |
| | MATERIAL PARAMETERS | | |
| | ADDITIONS | | |
| | CONSUMPTION | | |
| QUALITY FORWARD | TESTS | | |
| | EVALUATION | | |
| QUALITY BACKWARD | 1 | DEFECT-KIND/TYPE | |
| | | QUANTIFICATION | |
| | | EVALUATION | |
| | 2 | PROBLEM DESCRIPTION | |
| | | INTERIM CONTAINMENT ACTIONS | |
| | | POTENTIAL CAUSE(S) IDENTIFICATION | |
| | | ROOT CAUSE IDENTIFICATION | |
| | | VERIFICATION OF CORRECTIVE ACTIONS | |
| | | PERMANENT CORRECTIVE ACTIONS | |
| | | PREVENTATIVE ACTIONS | |
| PEOPLE | STANDARD TRAINING PROGRAM | | |
| | BASF SERVICES | | |
| | DESCRIPTION OF SERVICES | | |
| ECONOMY | PER KG/GAL. | | |
| | PER CAR | | |
| | QUALITY COST-INTERNAL | | |
| | QUALITY COST-EXTERNAL | | |
| AGREEMENT | WHO DOES WHAT? BASF/CUSTOMER | | |
| | CONTRACT-CUSTOMER | | |
| | CONTRACT-TIER 2 SUPPLIER | | |

*Fig-10A*

PAINT APPLICATION DATA STRUCTURE

CORE PROCESS STEPS
PAINT SHOP OPERATIONS

| | 1 | 2 | 3 | 4 | 5 | 6 | 7 | 8 | 9 | 10 | 11 | 12 | 13 | 14 | | | | | | |
|---|---|---|---|---|---|---|---|---|---|---|---|---|---|---|---|---|---|---|---|---|
| STORAGE-CUSTOMER | STORAGE-CUSTOMER | MIXROOM | MIXROOM | PRE-CLEANING | PHOSPHATE | ELECTROCOAT | CLEANING-MANUAL | CLEANING-AUTOMATION | MANUAL APPLICATION | ROBOTS-INTERIOR/EXTERIOR | ROTATIONAL ATOMIZERS-BELLS | AIR ATOMIZERS-RECIPROCATOR | FLASH-OFF | BLOW-OFF | INFRARED | OVENS | MISC. AUTOMATED APPLICATIONS | MANUAL AUXILIARY OPERATIONS | AUTOMATIC AUXILIARY OPERATIONS | ZONE w/o APPLICATION OPERATION | SEALANT | UNDERBODY PRIME | WAX | WINDOW GLAZING | TRANSPORTATION CONCERNS | COAGULATION |

*Fig-10B*

PAINT MANUFACTURING DATA STRUCTURE

| DATA STRUCTURE ==> | | | | |
|---|---|---|---|---|
| MODULE WITHIN DATA STRUCTURE ==> | MATERIALS | QUALITY BACKWARD | PROCESS | MATERIALS |
| SUBMODULE ==> | PRODUCT INFORMATION | DEFECT | ENVIRONMENTAL PARAMETERS | MATERIAL DATA |
| | 832-1435: METALLIC DK BLUE | METALLIC DK BLUE IS WAY OFF COLOR- 27.00LAB | 75 DEGREES F | RESIN #305 AND #419 USED TO FORMAULATE 832-1435 |

RESIN MANUFACTURING DATA STRUCTURE

| MATERIALS | EQUIPMENT | PEOPLE | QUALITY BACKWARD | QUALITY FORWARD |
|---|---|---|---|---|
| PRODUCT INFORMATION | EQUIPMENT | JOB TITLE | IN-PROCESS BATCH CONTROL | TESTS |
| RESIN #305 | REACTOR VESSEL 32A | T. SMITH (CHIEF RESIN REACTION OPERATOR) | QUALITY ASSURANCE TEST #10 USED AT 10:00 AM ON 7/7/97 AND SATISFIED SINCE VISCOSITY AT 35 CPS. | FOR BEST RESULTS WITH RESIN #305: USE QUALITY ASSURANCE TEST #10 WHEREIN VISCOSITY SHOULD BE WITHIN THE RANGE 30-40 |
| RESIN #419 | REACTOR VESSEL 33A | T. SMITH (CHIEF RESIN REACTION OPERATOR) | QUALITY ASSURANCE TEST #10 USED AT 10:07 AM ON 7/7/97 AND SATISFIED SINCE VISCOSITY AT 37 CPS. | FOR BEST RESULTS WITH RESIN #305: USE QUALITY ASSURANCE TEST #10 WHEREIN VISCOSITY SHOULD BE WITHIN THE RANGE 30-40 |

*Fig-11A*

| | LEVEL OF AUTHORIZATION FOR SECURITY | | | | | | | |
|---|---|---|---|---|---|---|---|---|
| | PROCESS CONTROL DATA | | | | | VIEDO NETSCAPE SOFTWARE | | |
| | ORACLE SOFTWARE | VIEW ONLY-NETSCAPE SOFTWARE | | | | | | |
| PAINT MANUFACTURER | 1 PLANT 1 CUSTOMER | 1 PLANT 1 CUSTOMER | MULTIPLE PLANTS 1 CUSTOMER | ALL PLANTS 1 CUSTOMER | ALL PLANTS ALL CUSTOMERS | 1 PLANT 1 CUSTOMER | ALL PLANTS 1 CUSTOMER | ALL PLANTS ALL CUSTOMERS |
| FTSRs | X | X | | | | | | X |
| ACCOUNT MGRS. | | | X | | | | | X |
| CTS PROJECT LEADERS | | | X | | | | | X |
| CTS ASSOCIATES | | | X | | | | | X |
| ACCOUNT LEADERS | | | | X | | | | X |
| DIRECTORS | | | | | X | | | X |
| PC/V.I.S. TEAM | | | | | X | | | X |
| CUSTOMERS | | | | | | | | |
| PLANT PAINT AREA MGRS. | | | | | | X | | |
| PLANT ENGINEERS | | | | | | X | | |
| PLANT PERSONNEL | | | | | | X | | |
| PLATFORM TEAMS | | | | | | | X | |
| CENTRAL OFFICE PERSONNEL | | | | | | | X | |

*Fig-11B*

WEEKLY REPORTS

SELECTED SEARCHCONDITIONS:

PLANT: U.S. TEST
PERIOD: WEEK 39 / 1997 UNTIL WEEK 43 / 1997
PRODUCTS: ALL LAYERS

| WEEK 41 1997 | SHOW THE BATCH EVALUATIONS OF THIS WEEK | |
|---|---|---|
| | METALLIC | DK. BLUE IS WAY OFF COLOR- 27.00LAB |
| | | SILVER MET. RUNNING OK. |
| | | RED MET. IS RUNNING BETTER THAN NORMAL . SPRAYING WETTER, NO MOTTLE |
| WEEK 43 1997 | SHOW THE BATCH EVALUATIONS OF THIS WEEK | |
| | FÜLLER | SMOKE PRIMER IS CRATERING |
| | | RED PRIMER IS RUNNING WELL |
| | | GREY AND TITANIUM HAD VISCOSITY PROBLEMS. |

*Fig-15*

COMPUTERIZED VIRTUAL PAINT MANUFACTURING AND APPLICATION SYSTEM

This is a continuation of U.S. patent application Ser. No. 08/966,960, filed Nov. 10, 1997; now U.S. Pat. No. 6,073,055 issued Jun. 6, 2000.

BACKGROUND OF THE INVENTION

1. Field Of The Invention

The present invention relates generally to painting systems and more particularly to paint manufacturing, paint application and paint product data acquisition and processing.

2. Description

Operations within automotive painting contain many devices and process controllers that chiefly work independently to achieve their individual goals. Moreover, data is individually obtained from them without a structured framework to synthesize the data so that an overall systems analysis of the painting system can be performed.

Information from automotive painting facilities is not only difficult to synthesize for an overall systems perspective, but the information leaves the "hermetic" environment of these painting facilities with great difficulty. Outside sources, such as remote customer sites, need access to this synthesized information so that they can make informed decisions about certain operational characteristics of the automotive painting factories. For instance, customers wish to know how well their experimental painting products are performing in the automotive factory environment as well as the paint manufacturers and developers. Also lacking are the tools needed by the remote sites, to "fine tune" operational parameters in order to fix painting operations or chemistries that are not in tolerance with such predefined standards as MSDS standards. Accordingly, there is a need to overcome these and other disadvantages exhibited by previous approaches to operating paint-related facilities.

SUMMARY OF THE INVENTION

In accordance with the teachings of the present invention, a computer-implemented apparatus and method are provided for coordinating paint-related process steps of at least one paint-related facility. The paint-related process steps exhibit paint-related characteristics. A data acquisition module is provided for acquiring paint characteristic data indicative of the paint-related characteristics. A paint process control data structure is provided for interrelating the acquired paint characteristic data with at least two of the paint-related process steps to produce interrelated paint process control data. A paint process control coordinator is connected to the data acquisition module for storing the acquired paint characteristic data in the paint process control data structure. A data display is connected to the paint process control data structure for remotely receiving and viewing the interrelated paint process control data.

BRIEF DESCRIPTION OF THE DRAWINGS

Additional advantages and features of the present invention will become apparent from the subsequent description in the appended claims, taken in conjunction with the accompanying drawings in which:

FIG. 5a is a front view of a painting panel to be analyzed by the paint analyzer device;

FIG. 5b is an exemplary contour plot output from the paint analyzer device that depicts lightness values as related to positions on the panel of FIG. 5a;

FIGS. 6a–6b are screen displays of the paint simulator computer program;

FIG. 9 is an exemplary computer screen display for the data acquisition and interrelationship of paint manufacturing process control data;

FIG. 10 is an exemplary computer screen display for the data acquisition and interrelationship of vehicle assembly manufacturing process control data;

FIG. 11a is an exemplary computer screen display showing cross-dependencies through utilization of the links among the data structures of the present invention;

FIG. 11b is an exemplary computer screen display for the level of authorization for accessing the information within the present invention;

FIG. 15 is a computer printout depicting an exemplary weekly report as generated by the present invention.

DESCRIPTION OF THE PREFERRED EMBODIMENT

Figure 1:
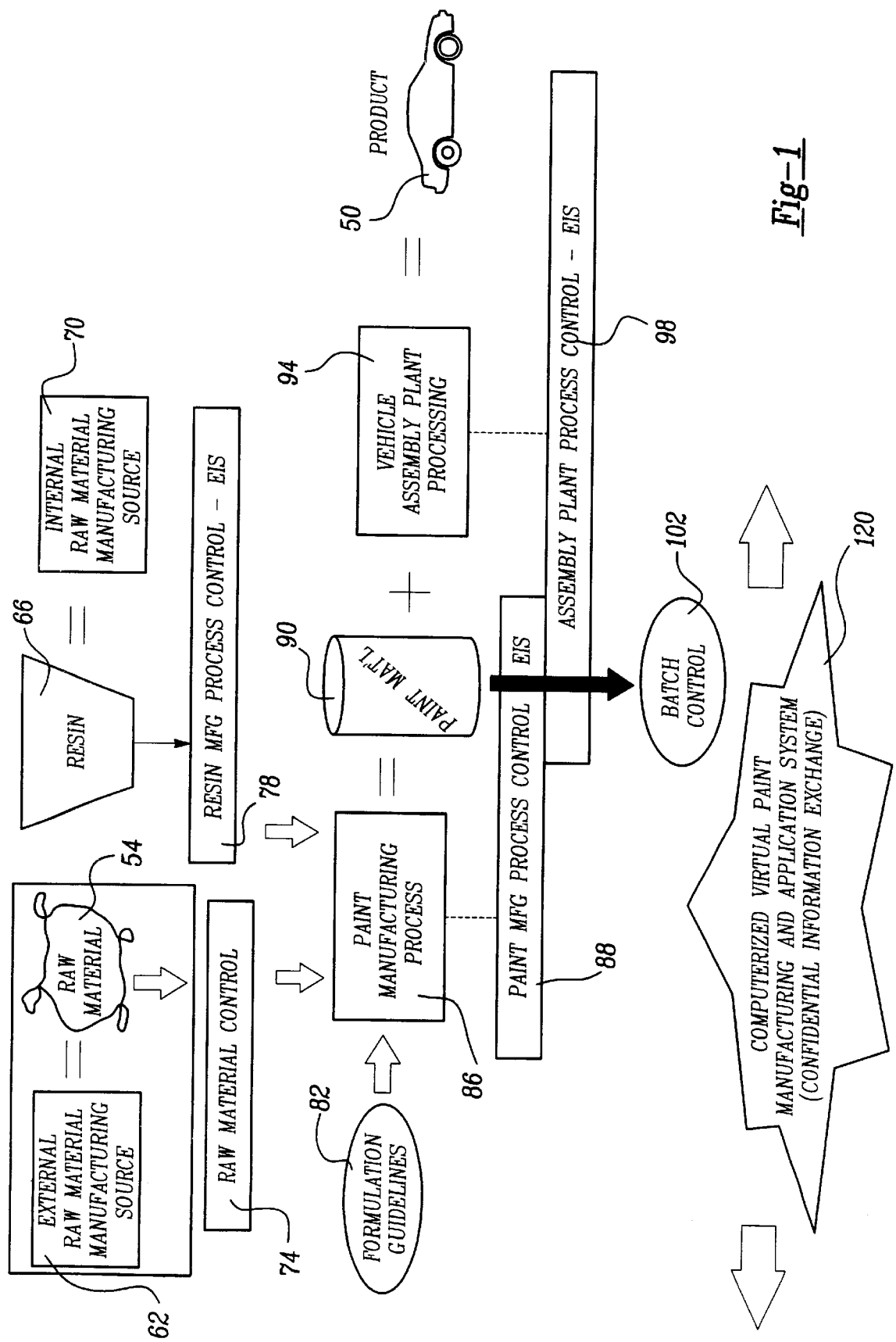
FIG. 1 is a process flow diagram depicting the steps involved in the overall painting system.

FIG. 1 illustrates the overall steps in a paint manufacturing and application system. The ultimate purpose of the overall process is to apply manufactured paint onto a vehicle 50 within predefined tolerances. These tolerances include quality tolerances, and ecological tolerances.

Raw material 54 comes into the paint manufacturing and application system from an external raw material manufacturing source 62. Moreover, resin 66 comes into the paint manufacturing and application system from an internal raw material manufacturing source 70. The terms "external" and "internal" refer to the sources of the material that internal and external to the company that is responsible for the paint manufacturing and delivery of the manufactured paint to a vehicle assembly plant.

Data acquisition is performed with respect to raw material 54 by raw material control process block 74. Likewise, data acquisition concerning resin 66 is performed by resin manufacturing process control block 78. The data acquired by blocks 74 and 78 is specially structured so as to provide systems-type information with respect to each process step involving raw material 54 and resin 66. Data acquisition is preferably captured through electronic sensors that sense the paint-related characteristics and electronically forward the data to the present invention for synthesis and storage. Also, the present invention supports manual entry of data as well as electronic retrieving the data needed by the present invention directly from databases. This novel data acquisition and its data structures as utilized by blocks 74 and 78 are more fully discussed below.

Formulation guidelines 82 indicate the manner by which raw material 54 and resin 66 are to be combined in the paint manufacturing process block 86 so as to produce paint material 90. These formulation guidelines 82 include such guidelines as quantity and temperature at which raw material 54 and resin 66 are to be combined. Data acquisition concerning the manufacturing of the paint is performed by the paint manufacturing process control block 88.

Paint material 90 is delivered to a vehicle assembly plant for processing within that plant as indicated by block 94. Within the vehicle assembly plant processing block 94, data acquisition is performed by assembly plant process control block 98. Block 98 acquires data related to paint material 90 and its application as the paint material 90 courses through each process step within vehicle assembly plant processing block 94. The data as acquired by paint manufacturing process control block 88 and assembly plant process control block 98 are used for such purposes as batch control 102. Batch control 102 is intended only for illustration of the use of the present invention and is not intended to limit the scope of application of the present invention. Batch control 102 includes analyzing the data acquired from blocks 88 and 98 to determine whether paint material 90 is within predefined tolerances.

The data acquired by blocks 74, 78, 88 and 98 all reside within the computerized virtual paint manufacturing and application system 120 which structures the data so that an overall system perspective can be obtained as well as by providing an environment for entities to remotely view the data captured by the present invention.

Figure 2:
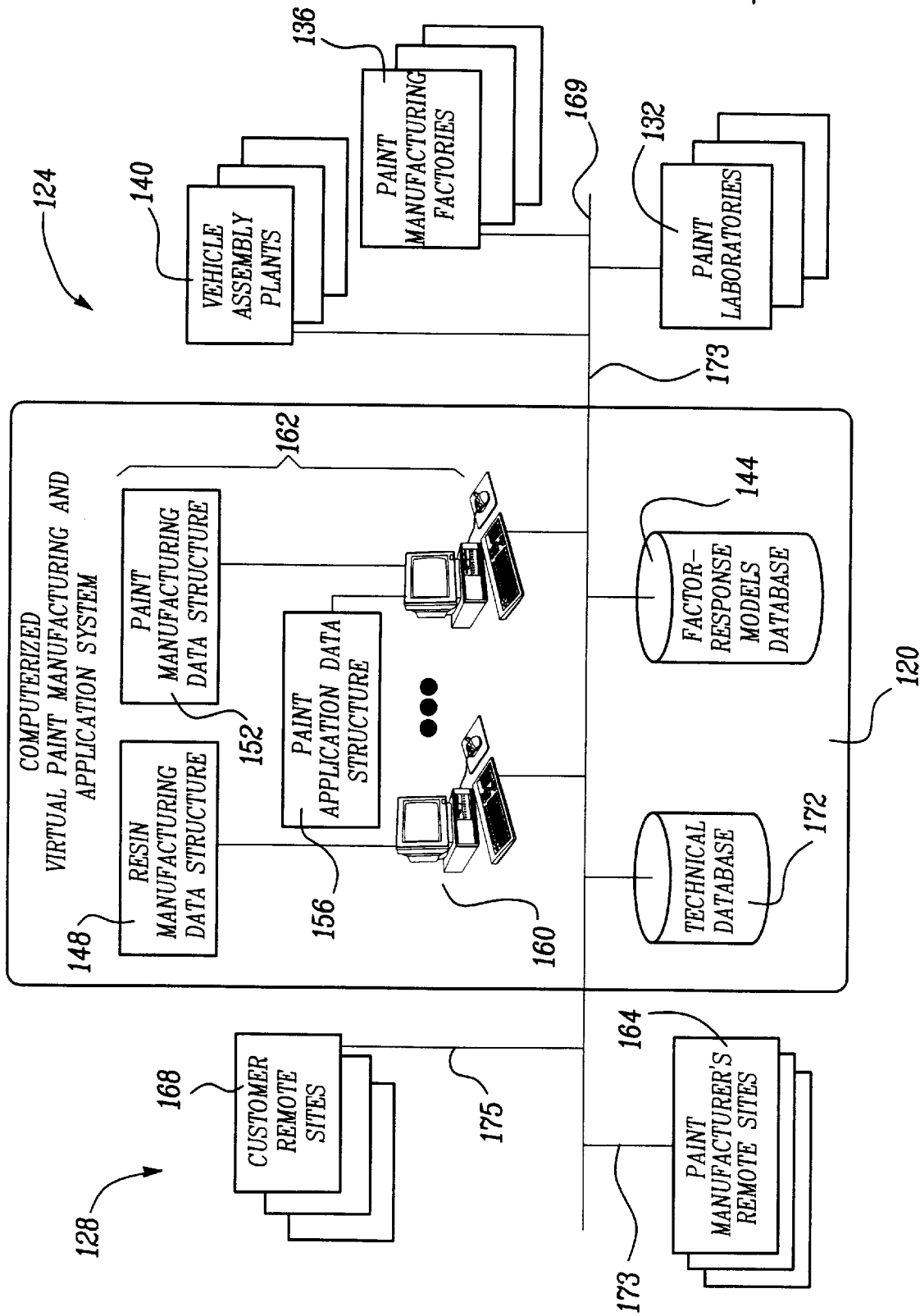
FIG. 2 is a network schematic diagram showing the data interconnections of the components of the preferred embodiment of the present invention.

FIG. 2 shows a network schematic of the interconnections among components of the computerized virtual paint manufacturing and application system 120 and sources of data as generally depicted at 124 and recipients of the data as generally depicted at 128. Data sources 124 include data being acquired from one or more paint laboratories 132, one or more paint manufacturing factories 136, and one or more vehicle assembly plants 140.

Paint laboratories 132 provide technical data about paint material, such as mathematical models that interrelate painting factors (e.g., control settings for paint spraying equipment) with paint responses (e.g., gloss of a paint). The models are stored within the computerized virtual paint manufacturing and application system 120 in the factor-response models database 144. Moreover, paint laboratories 132 provide technical data to populate one or more of the following data structures that are contained within the computerized virtual paint manufacturing and application system 120: resin manufacturing data structure 148; paint manufacturing data structure 152; and paint application data structure 156.

The resin manufacturing data structure 148 relates to the data obtained from resin material control process block 74 and resin manufacturing process control block 78 (of FIG. 1). Paint manufacturing data structure 152 corresponds to the data acquired from paint manufacturing process control block 88 (of FIG. 1). Also, paint application data structure 156 corresponds to the data acquired from the assembly plant process control block 98 (of FIG. 1).

Data structures 148, 152 and 156 are located on one or more computers as generally depicted at 160. The data structures 148, 152, and 156 provide a novel structure for assisting in data acquisition from the data sources 124 and in the presentation and analysis of the data by data recipients 128.

Computers 160 are preferably located within the physical location of the source of the data. For example, the data that is acquired from paint manufacturing factory 136 is preferably placed into a computer that is located at the paint manufacturing factory 136. Likewise, a computer containing the paint application data structure 156 is located at a vehicle assembly plant 140. Data structures 148, 152 and 156 and computers 160 are collectively termed the process control coordinator 162. Computers 160 have the capability to input and to view data that is stored in databases located on networks 169 subject to computerized security authorization.

The information as structured by data structures 148, 152, and 156 are able to be retrieved and analyzed by the data recipients 128, such as at a paint manufacturer remote sites 164 and at customer remote sites 168. To allow the data recipients 128 to analyze the painting system from an overall systems perspective, a technical database 172 provides additional paint-related data, such as, but not limited to, ecological and internal company quality standards.

Networks 169 connect the various components of the system so that data communication can occur. The preferred embodiment for networks 169 utilizes an Intranet network 173 to perform data communication between components within the computerized virtual paint manufacturing and application system 120 and within the data sources 124. Moreover, paint manufacturer's remote sites are connected to Intranet 173. The customer remote sites 168 are connected to an Extranet network 175 to better ensure proper security exists in accessing the data from the computerized virtual paint manufacturing and application system 120. Security data is located preferably in technical database 172 for ensuring that only authorized users (whoever and wherever they may be) can view the portions of the information contained within the computerized virtual paint manufacturing and application system 120 that they are authorized to view.

Figure 3:
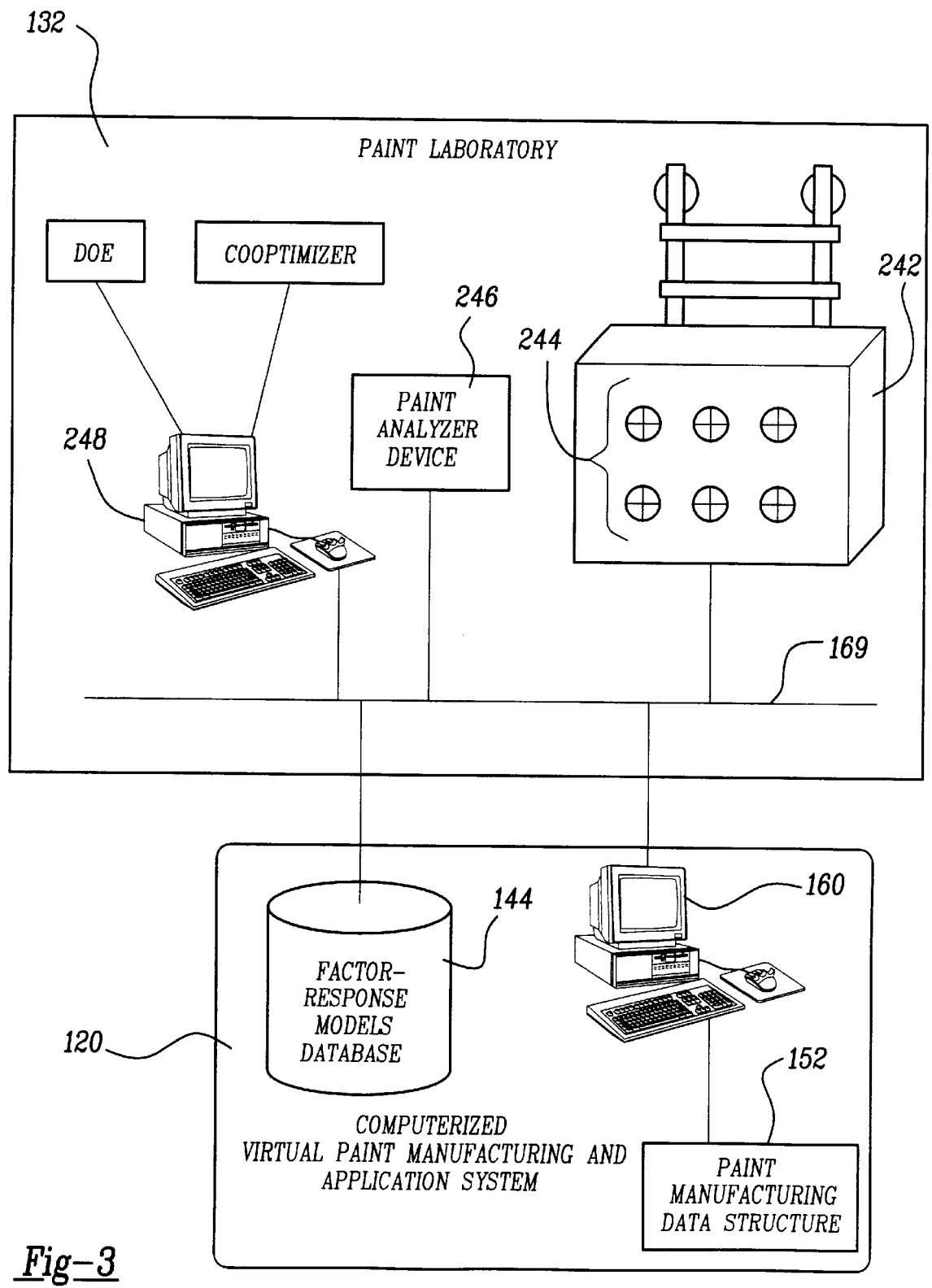
FIG. 3 is a network schematic diagram depicting the data interconnections between a painting laboratory and the virtual paint manufacturing and application system.

FIG. 3 depicts the preferred embodiment for the data interconnection between one of the paint laboratories 132 and the computerized virtual paint manufacturing and application system 120. Within paint laboratory 132, painting equipment 242 is controlled by control settings 244 in order to spray paint upon vehicles. The sprayed paint is analyzed by a paint analyzer device 246. The paint analyzer device 246 examines the physical characteristics of the sprayed paint so that subsequent analysis can reveal how the paint responds under various conditions and under various formulations. The paint analyzer device 246 examines such physical characteristics as, for example, color (e.g., L, a, b values at different angles), leveling (in the form of wave scanned values), gloss, haze, and film thickness. In the preferred embodiment, paint analyzer device 246 is a device known as "PROSIM" which is obtainable from BASF.

Paint analyzer device 246 is preferably in data communication with a paint simulation computer program 248. Paint simulation computer program 248 models the interrelationship between automotive painting equipment and the sprayed paint so that desired painting characteristics can be achieved. A factor-response models database 144 is used for storing mathematical models which interrelate painting factors with painting responses. Painting factors relate to the control settings 244 of the painting equipment 242. Painting responses relate to such painting characteristics as those that may be obtained from the paint analyzer device 246.

Paint simulation computer program 248 employs design of experiment techniques, as well as cooptimization techniques in order to determine the values for the painting responses based upon desired painting tolerances to be achieved. For a more complete understanding of the paint simulation computer program 248, please refer to U.S. Pat. No. 6,064,919 (entitled "Paint Equipment Set-up Method and Apparatus"), issued May 16, 2000 which is hereby incorporated by reference.

Paint simulation computer program 248 has as one of its purposes the capability of identifying regions within the mathematical models that need to be better defined. For example, a range of painting factor values that result in relatively low R-squared values for the paint responses indicate regions within the mathematical models that need refinement. These regions within the mathematical models are specifically tested through a design of experiments technique by the paint laboratory, and data points are collected by the paint analyzer device 246. The design of experiments factor-response models are refined to incorporate this additional detail.

Computer 160 utilizes paint manufacturing data structure 152 to acquire data from paint analyzer device 246 and paint simulation computer program 248. This acquired data is used for several purposes including performing batch control (i.e., to ensure compliance with quality standards as contained in the technical database). Such paint characteristic data as the paint film thickness data from the paint analyzer device 246 is interrelated with the type of paint material within the paint manufacturing data structure 152.

Another example is the following. The paint simulation computer program 248 performs design of experiments calculations based upon the data from the paint analyzer device 246 in order to identify which parameters and variables are key in the paint manufacturing and vehicle assembly factory. These identified key parameters are inserted into the process control data structures (such as the paint manufacturing data structure and the vehicle assembly data structure).

Figure 4:
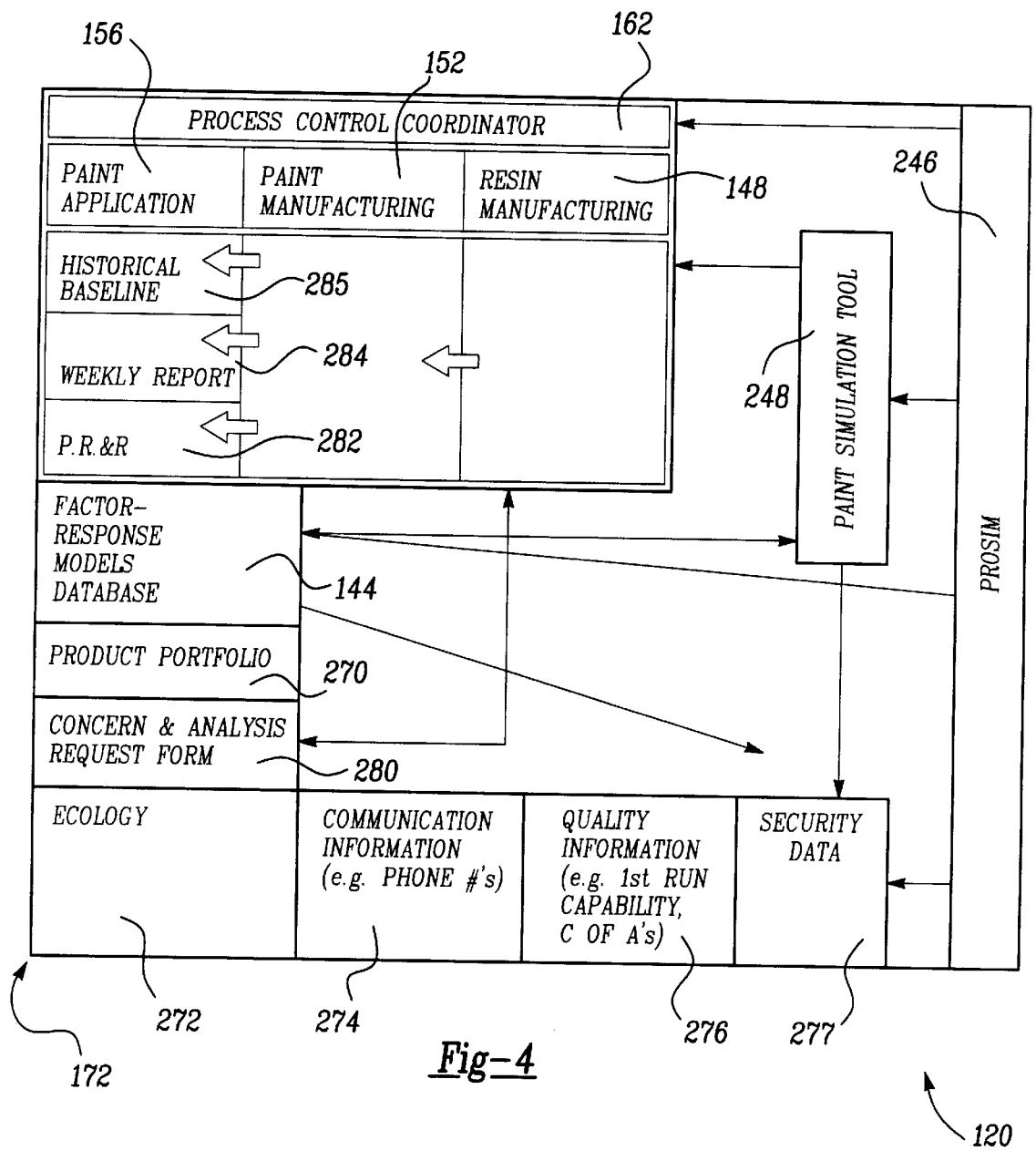
FIG. 4 is a functional data flow diagram depicting the data flow among components of the present invention.

FIG. 4 shows the detailed informational flow among the aforementioned components of the present invention. In the preferred embodiment, the PROSIM device 246 provides paint characteristic data to the paint simulation computer program 248 so that factor/control settings can be determined to produce certain paint appearance and application responses of the sprayed paint.

The data from the PROSIM device 246 is used by the process control coordinator 162 in order to perform batch control. Within that capacity, the PROSIM device 246 allows paint material from a paint manufacturing plant to be analyzed to ensure compliance with predefined quality standards. The batch control data from the PROSIM device 246 is used to populate the paint manufacturing data structure 152 (especially with respect to the quality forward portion of the data structure).

As described above, paint simulation computer program 248 uses factor-response models database 144 in order to perform its design of experiments calculations. Also, paint simulation computer program 248 updates factor-response models database 144 based upon actual paint spraying system performance data as provided by PROSIM device 246. Paint simulation computer program 248 along with the factor-response models database 144 provides the ability to monitor and control variable parameters via technical database 172. Technical database 172, in its preferred embodiment, contains such information as paint product portfolio information 270, ecology information 272, communication information 274, and quality information 276 (such as first run capability). Technical database 172 also contains concern and analysis request forms 280 so that issues and concerns and their subsequent analysis and resolution can be captured. Security data 277 about how an entity that is external to the computerized virtual paint manufacturing and application system 120 may access the information is also contained in the technical database 172.

Process control coordinator 162 synthesizes and packages the data from the data sources so that remote systems can efficiently and effectively analyze the historical, current and potential operational characteristics of the entire painting system (i.e., life history analysis). Process control coordinator 162 synthesizes and packages the data into the resin manufacturing data structure 148, paint manufacturing data structure 152, and the paint application data structure 156 based upon the type of data provided and which particular data source provided the data.

Additionally, process control coordinator 162 provides problem resolution and reporting information to the data destinations based upon the information captured by the computerized concern and analysis request forms 280. The problem resolution reporting module 282 allows the data destination remote sites to use previous solutions to similar problems in order to solve existing problems. Moreover, a weekly report module 284 of the process control coordinator 162 provides for an automated capability to send the information from the various components of the present invention to the data destination remote sites.

Process control coordinator 246 provides a time stamp for each datum received from the data sources. Not only does this create a historical baseline snapshot 285, but it also allows the amount of change at different times in the entire paint manufacturing system to be analyzed.

FIG. 5a shows how the PROSIM device captures paint characteristic data from panel 290. The regions as exemplarily identified by reference numeral 291 illustrate where the PROSIM device performs its measurements. For this example, a varying amount of basecoat 292 was applied to panel 290. The panel's top 290a contained a thin coating of basecoat whereas the panel's bottom 290b contained a greater amount of basecoat. For this example, a consistent amount of clearcoat 294 was applied to panel 290. The varying amount approach with respect to basecoat 292 is possible with the PROSIM device since the PROSIM device captures paint characteristic data across the entire panel.

Figure 5B:
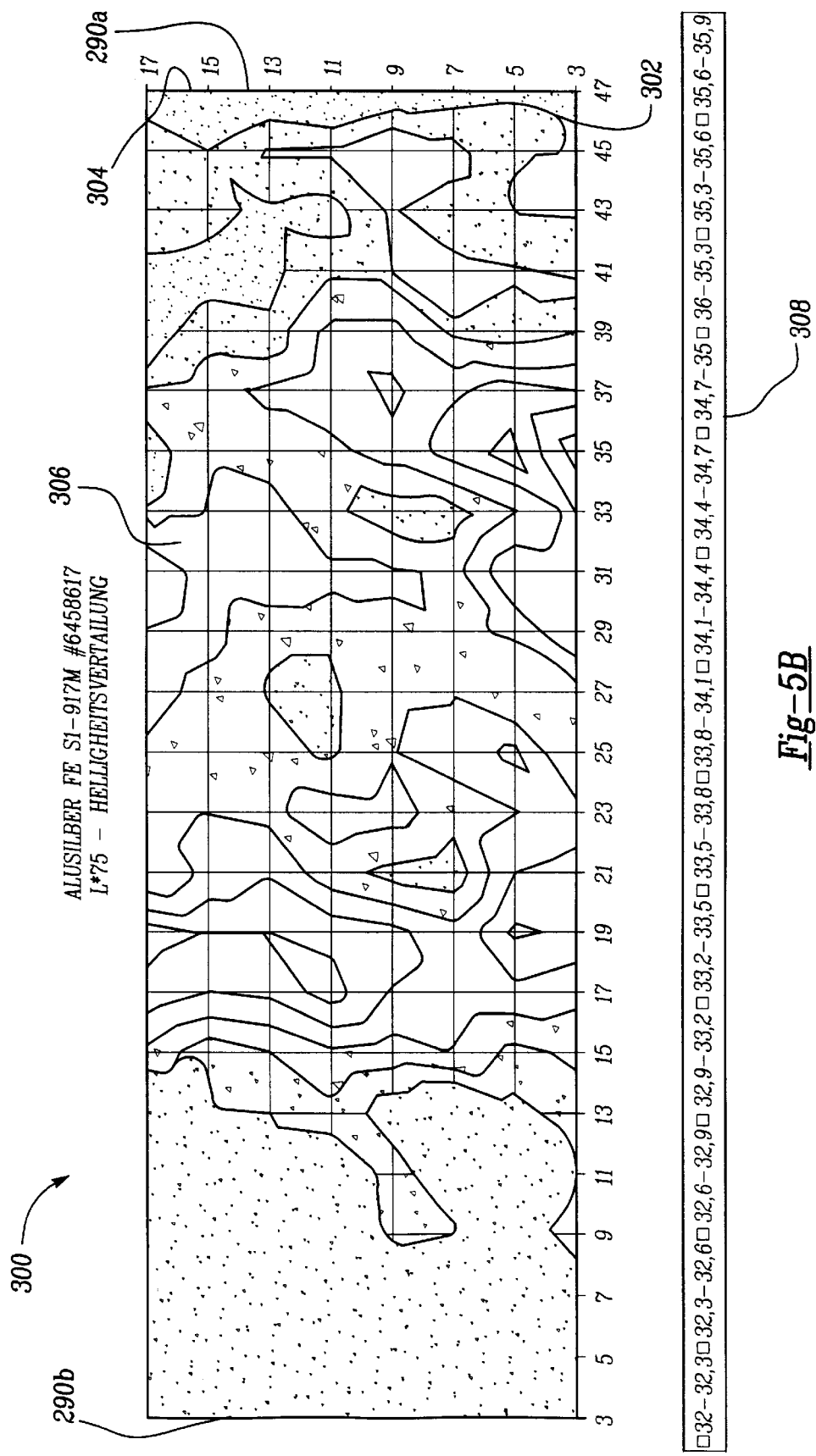

To illustrate the entire panel analysis approach of the PROSIM device, FIG. 5b shows a sample contour plot 300 output from the PROSIM device that interrelates lightness value of the paint with the position of the paint on the panel of FIG. 5a. The abscissa axis 302 shows the vertical position values of the panel while the ordinate axis 304 shows the horizontal position values of the panel. Regions within contour plot 300 reveal how the lightness values vary over panel position. For example, region 306 depicts an area on the panel that has a lightness value as provided on reference bar 308.

Figure 6A:
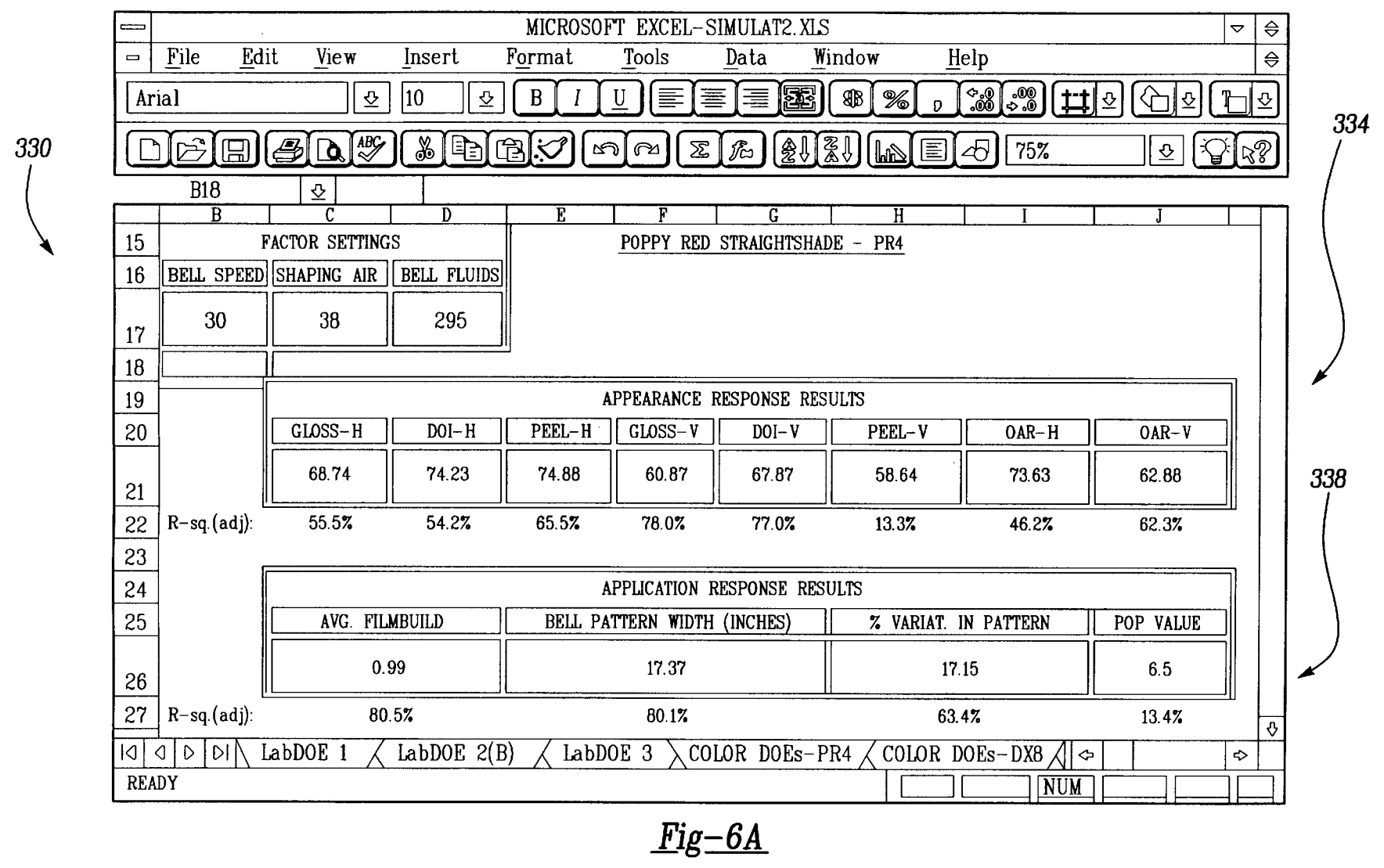

FIG. 6a is an exemplary screen display from the paint simulation computer program wherein factor/control settings of the paint spraying equipment is generally shown at 330. The factor settings are interrelated through mathematical models with certain responses of the sprayed paint as generally shown at 334 and 338. The mathematical models were generated through design of experiments techniques. In this example, the bell speed, shaping, and bell fluids factor/control settings 330 produce via the mathematical models the paint appearance and application air response as shown at reference numerals 334 and 338.

Figure 6B:
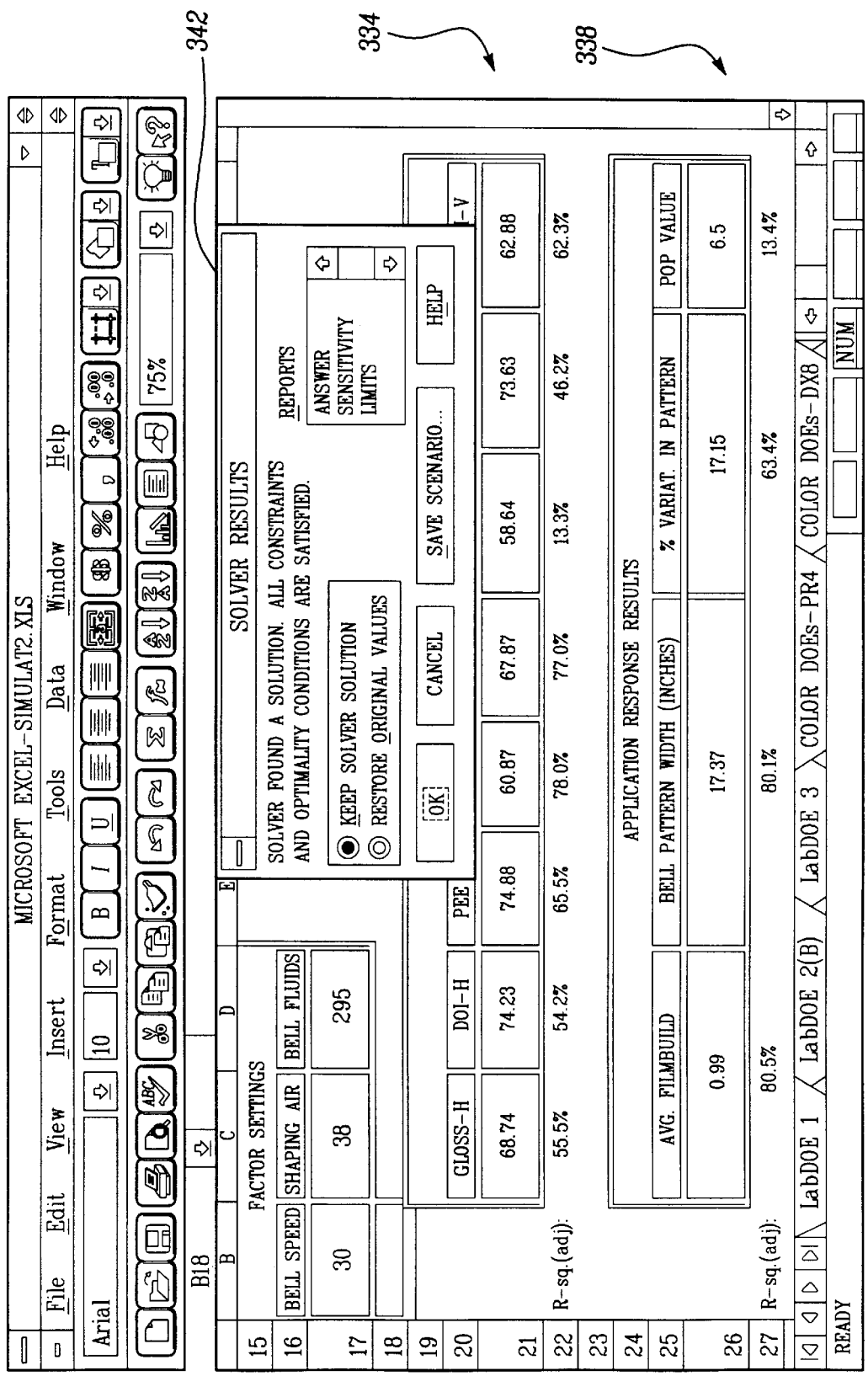

With reference to FIG. 6b, a cooptimizer 342 is utilized to maintain one or more of the factor/control settings and/or response values at a certain level or range while allowing other settings and/or responses to vary within a predefined range. In this example, the shaping air and bell fluids factor/control settings were respectively fixed at 36 pounds per square inch and 295 cubic centimeters/minute. Moreover, in this example the average film build response was fixed by the cooptimizer 342 to be within the range 0.90 to 1.0 mils. Cooptimizer 342 preferably employs a simplex algorithm such as the one provided by the Microsoft Excel software product.

Figure 7A:
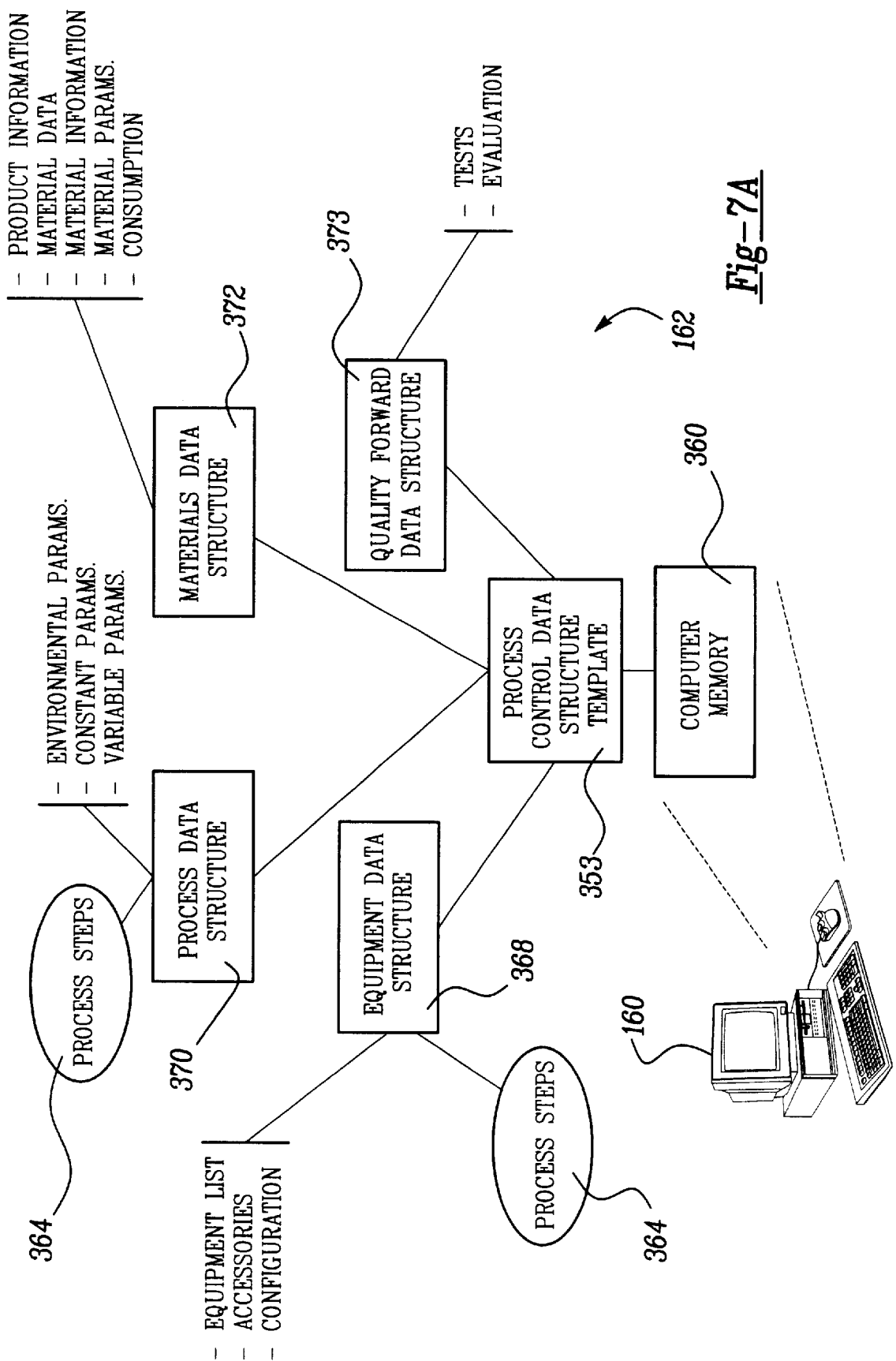
FIGS. 7a–7b are schematics of the memory and data structures utilized within the present invention.

FIG. 7a depicts the process control data structure template 353 as contained in the computer memory 360 of computer 160. These components are part of the process control coordinator 162.

Process control data structure template 353 interrelates paint-related data with one or more relevant process steps of the paint spraying system. The process steps 364 include the steps used within the process of a paint laboratory, or a resin manufacturing factory, or a paint manufacturing factory, or a vehicle assembly plant. For example, a process step within a vehicle assembly plant may include the process step of when the paint is in storage or when the paint is in the mixing room, or the particular sprayed paint coating that has been applied to a vehicle.

Painting equipment data structure 368 interrelates with relevant process steps 364 such painting equipment related data as equipment type, accessories, and equipment configuration.

Process data structure 370 interrelates with relevant process steps 364 such process-related data as environmental parameters, constant parameters, and variable parameters. Environmental parameters include such items as line speed, booth temperature, and humidity. Constant parameters include, but are not limited to, application parameters that are substantially constant for each paint (e.g., oven temperature/profile, target distance). Variable parameters include, but are not limited to, application parameters that are different for each paint (e.g., fluid rate, bell speed).

Materials data structure 372 captures and stores such material related data as material parameters, additions to the material mixture, and consumption data. Specifically, consumption data refers to usage information, such as for example, consumption of resources or materials for a particular time period (e.g., on a daily basis) or consumption of resources or materials for a vehicle. Materials data structure 372 is preferably not interrelated with the process steps since typically materials-related data is not acquired until the end of an entire process (such as, at the end of the resin manufacturing process).

Quality forward data structure 373 captures and stores such quality forward-related data as testing data and evaluation data. The term "quality forward" refers to quality checking for such items as defects in the material before the material is produced by a painting facility. Quality forward typically uses laboratory testing to formulate predictions about how a material should perform in production. The paint laboratory configuration of FIG. 3 is preferably used to formulate such predictions for the quality forward data structure 373. Quality forward data structure 373 is preferably not interrelated with the process steps since typically the quality forward-related data is acquired before a process for a product begins (such as, at the beginning of the paint manufacturing process).

Figure 7B:
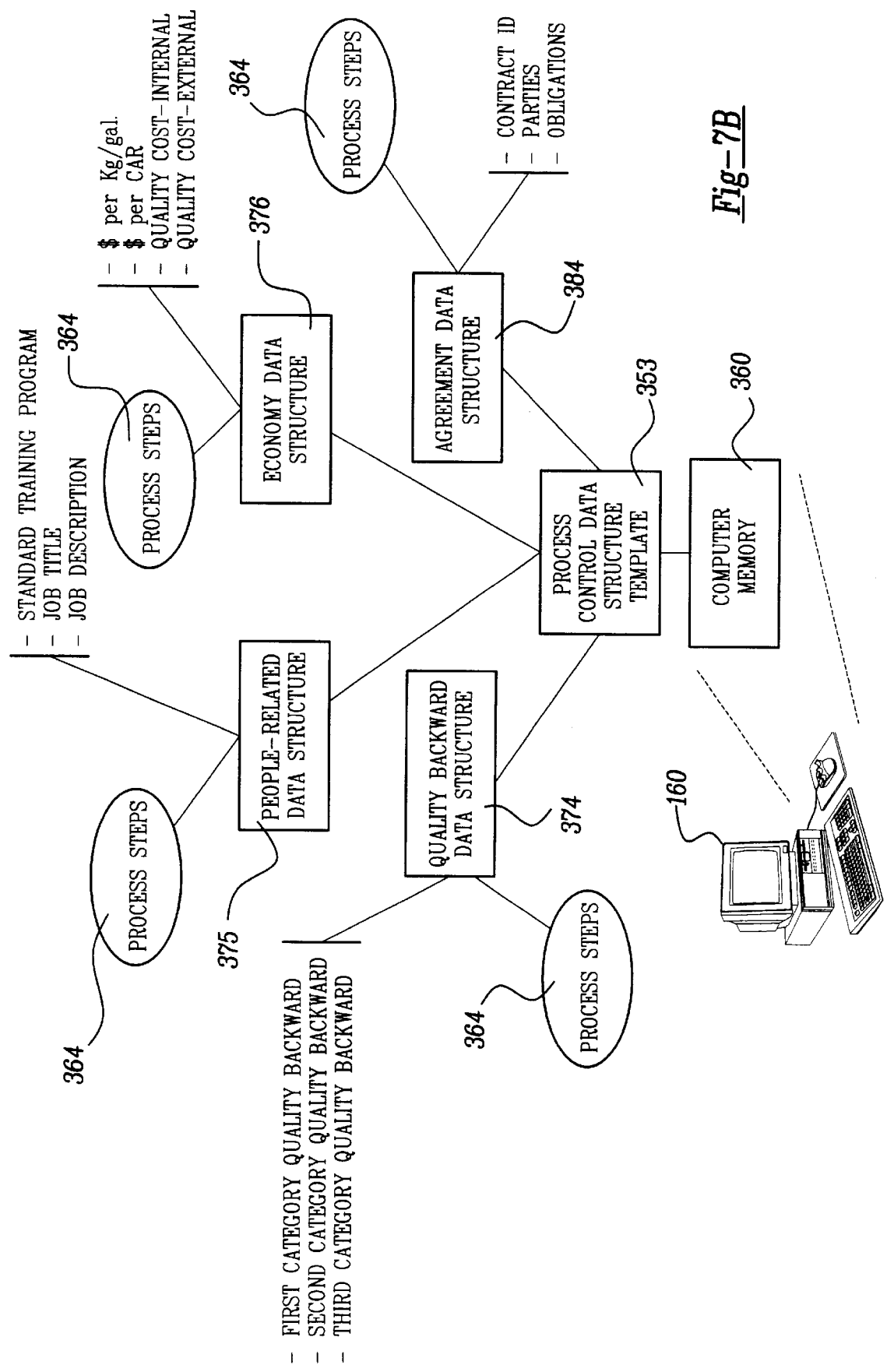

With reference to FIG. 7b, quality backward data structure 374 captures and stores such quality backward related data as first category quality backward data, second category quality backward data, and third category quality backward data. Quality backward data structure 374 interrelates with relevant process steps 364 such quality backward-related data as typically three categories of quality backward data. The first category addresses in-process batch control. The second category addresses defect-kind/type, quantification, and evaluation. The third category addresses: problem description, interim containment actions, potential causes(s) identification, root cause identification, verification of corrective actions, permanent corrective actions, and preventative actions. It should be noted that the present invention is not limited to three categories, but may include only one or two categories depending on the specification application. For example, the paint application data structure preferably contains only categories two and three for the quality backward related data since typically in-process batch control is not performed within the paint application process.

The term "quality backward" refers to adjusting the process based upon quality predictions, issues and resolutions identified in the "quality forward" data structure. In this capacity, "quality backward" operates as a feedback loop to fine tune the process.

People-related data structure 375 interrelates with relevant process steps 364 such people-related data as standard training program, job title, and job descriptions.

Painting economic data structure 376 interrelates with relevant process steps 364 such painting economic data as the money amount per kilogram per gallon of a particular paint type, the amount of money to spray a predefined automotive vehicle, and quality cost that is internal as well as external.

Lastly, an agreement data structure 384 is provided so as to interrelate contractual data, such as contract identification number and parties and obligations relevant to an agreement with relevant process steps 364.

Process control coordinator 162 creates and maintains the process control data structure template 353 during the data acquisition steps from each data source.

Figure 8:
FIG. 8 is an exemplary computer screen display for the data acquisition and interrelationship of resin manufacturing process control data.

FIG. 8 depicts the preferred embodiment of the process control data structure template for the resin manufacturing data structure 148. The process steps which are to be interrelated with the equipment, process, quality backward, people, economy, and agreement modules of the resin manufacturing data structure 148 are the following: material receipt, material storage, reactor/vessel preparation, intermediate processing, reactor/vessel charging, process, batch adjustment, material transfer, filtration, filling, equipment cleaning, product storage, and product delivery. It should be understood that the present invention is not limited to these process steps. The above list serves only for sake of example, and can be expanded or reduced based upon the specific application at hand.

The primary input materials described by the resin manufacturing data structure 148 is the chemicals that are used to produce the resins. The chemicals and their properties are described within the raw materials module of the resin manufacturing data structure 148. The primary output product described by the resin manufacturing data structure 148 are the resins that are produced from the chemicals.

FIG. 9 depicts the preferred embodiment of the process control data structure template for the paint manufacturing data structure 152. The process steps which are to be interrelated with the equipment, process, quality backward, people, economy, and agreement modules of the paint manufacturing data structure 152 are the following: material receipt, material storage, staging of materials, equipment preparation, raw material transfer, intermediate processing, batch blending, batch adjustment, filling process, equipment cleaning process, product storage, and product delivery to the vehicle assembly plant. It should be understood that the present invention is not limited to these process steps. The above list serves only for sake of example, and can be expanded or reduced based upon the specific application at hand.

The primary input materials described by the paint manufacturing data structure 152 are the resins that are the products of the resin manufacturing data structure 148 and external raw materials (such as, for example, pigments; the external raw materials are shown by reference numeral 62 on FIG. 1). The resins, the external raw materials, and the properties associated with them are described within the raw materials module of the paint manufacturing data structure 152. The primary output product described by the paint manufacturing data structure 152 are the manufactured paint materials that are produced from the resins and the external raw materials.

FIG. 10 depicts the preferred embodiment of the process control data structure template for the paint application data structure 156. The process steps which are to be interrelated with the equipment, process, quality backward, people, economy, and agreement modules of the paint application data structure 156 are the following: storage-customer, storage-customer mixroom, mixroom, pre-cleaning, phosphate, electrocoat, cleaning-manual, cleaning-automation, manual application, robots-interior/exterior, rotational atomizers-bells, air atomizers-reciprocator, flash-off, blow-off, infrared, ovens, miscellaneous automated applications, manual auxiliary operations, automatic auxiliary operations, zone without application operation, sealant, underbody prime, wax, window glazing, transportation concerns, and coagulation. It should be understood that the present invention is not limited to these process steps. The above list serves only for sake of example, and can be expanded or reduced based upon the specific application at hand.

The primary input materials described by the paint application data structure 156 are the paint materials that are the products of the paint manufacturing data structure 152. The paint materials and their properties are described within the materials module of the paint application data structure 156. The primary output product described by the paint application data structure 156 are the paint coatings upon vehicles.

Since variation exists within each painting process (i.e., resin manufacturing, paint manufacturing and paint application process), data structures 148, 152, and 156 are structured so that variations and cross-dependencies between materials and process steps can be analyzed within each painting process. Moreover, at least one common denominator/link exists among the data structures 148, 152, and 156 so that variations and cross-dependencies between materials and process steps can be analyzed across the entire painting process. Preferably, the link among the data structures 148, 152, and 156 are the output materials from one data structure that corresponds to the input material to another data structure. For example, the resin material from the resin manufacturing data structure 148 is used to link with information contained in the paint manufacturing data structure 152 since the output of the resin manufacturing data structure 148 corresponds to the input of the paint manufacturing data structure 152. Numeric identifiers are preferably used to uniquely identify the materials that link the data structures. FIG. 11a is a computer screen display that provides an example of using the links between the data structures to examine cross-dependencies from one paint process to another. In this non-limiting example, the problem as identified in the quality backward data structure is traced back across materials and processes to the possible root cause of a wrong quality assurance test being used to certify that Resin #419 is acceptable for use in production. Moreover, it should be understood that the present invention is not limited to only linking two data structures but includes linking all three data structures to form a complete life history view of the entire system, for example, by providing a life history view from the paint application data structure 156 through the paint manufacturing data structure 152 to the resin manufacturing data structure 148.

FIG. 11b depicts the preferred embodiment to ensure that the data is viewed by data destination remote sites in a secured manner. For example, the paint plant area managers which would be identified by a computer system identifier would only be able to view data within the present invention that relates to its own plant.

Figure 12:
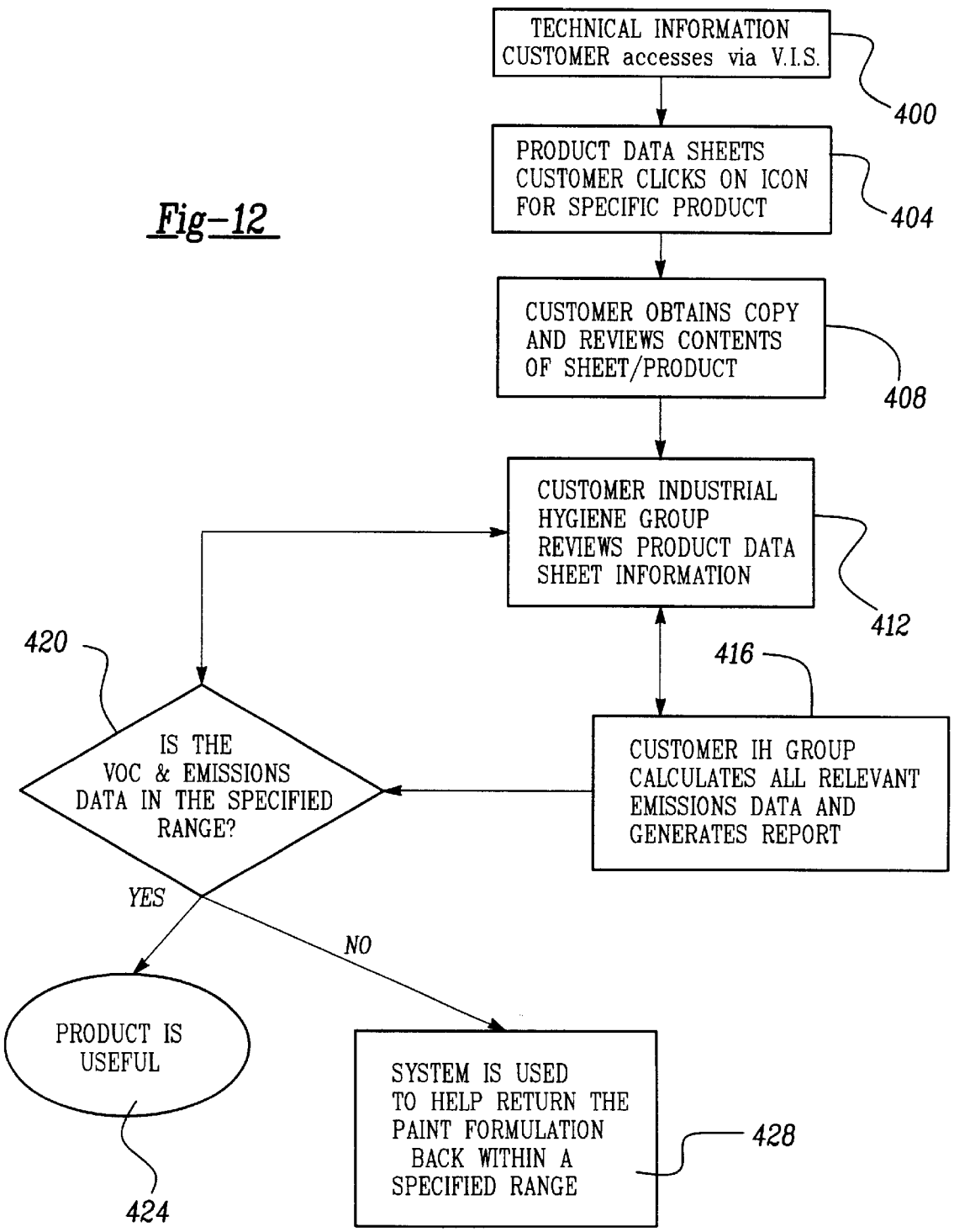
FIG. 12 is a flow chart depicting the use of the present invention to do environmental tolerance checking.

FIG. 12 depicts the steps wherein the data destination remote sites uses the information from the various components of the present invention in order to control the paint spraying system. At process block 400, a user, such as a customer, from a remote site obtains certain technical information regarding the paint spraying system. In order to obtain product data sheets, a customer invokes process block 404 by preferably clicking on an icon on the screen of the data destination remote site for a specific paint-related product. The requested product data sheet is retrieved from the technical data base and is sent to the customer at process block 408. At process block 412, a customer industrial hygiene group reviews the product data sheet information and performs at process block 416 all relevant emissions data. Preferably, the data destination remote site automatically calculates for the group the emissions data and produces a report that determines whether the volatile organic compounds (VOCs) and emissions data are in the specified range as determined by the ecological threshold values contained within the technical database. This determination is performed by decision block 420.

If decision block 420 determines that all VOCs and emissions data are in the specified range, then the product is determined to be "useful" at process block 424. However, if decision block 420 determines that the specified ranges have been violated, then the data destination remote site utilizes the paint simulation computer program and the data in the technical database in order to return the paint formulation back within the specified range. This processing is performed by process block 428.

Figure 13:
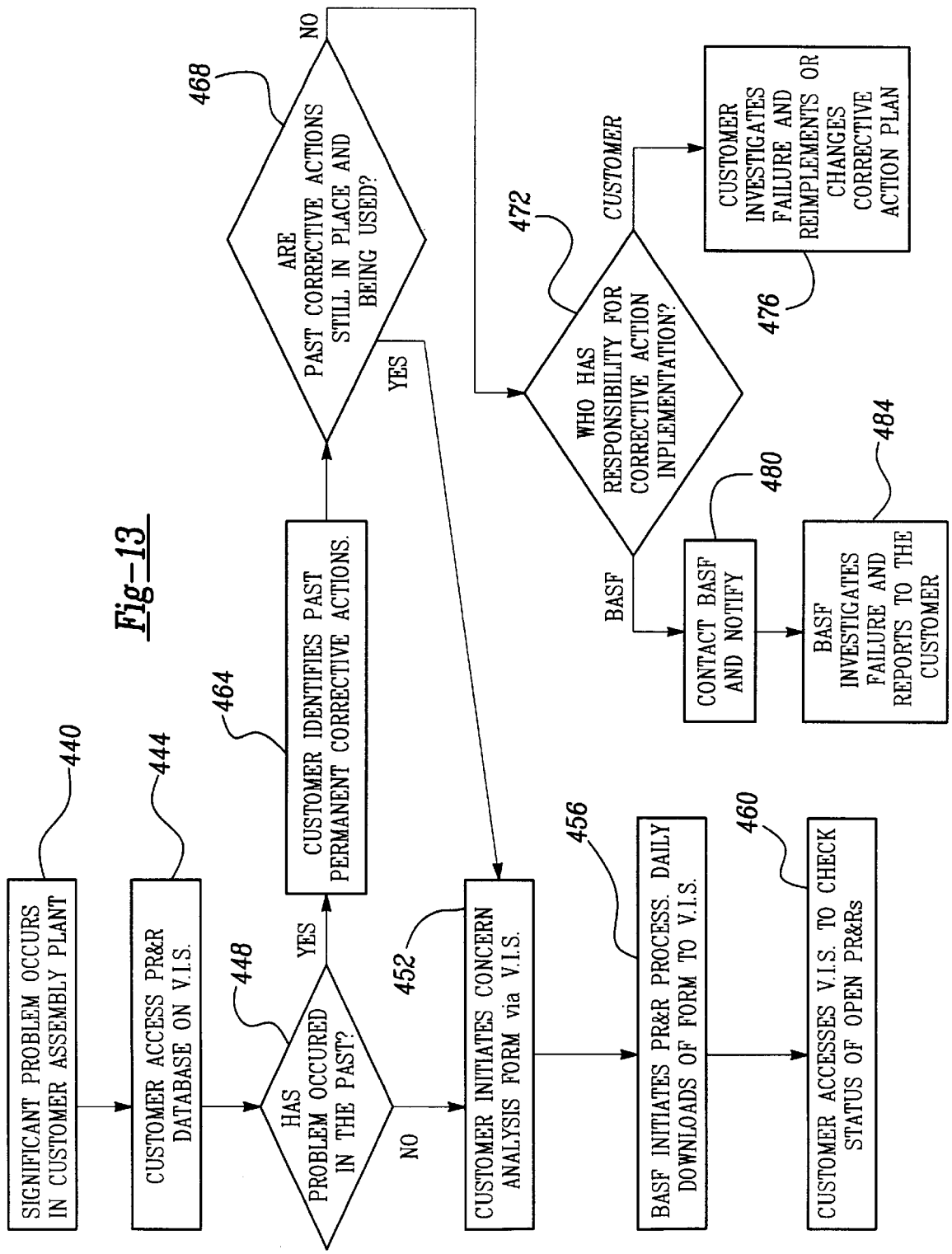
FIG. 13 is a flow chart depicting the steps used in the system performing problem resolution and reporting cause and effect analysis.

FIG. 13 depicts the steps for using the present invention in performing a problem resolution and reporting cause and effect analysis. The term "VIS" refers to the information presentation portions of the present invention to the data recipients.

At process block 440, a customer detects a problem occurring in a customer assembly plant. The customer accesses the process control coordinator data in order to determine at decision block 448 whether a similar problem has occurred in the past. If the problem has not occurred in the past, then the customer initiates at process block 452 the concern analysis form that is contained within the technical database of the present invention. Subsequently, process block 456 initiates a resolution procedure and updates the technical database with the manner in which the concern was addressed and solved. At process block 460, the customer is able to access the technical database in order to check on the status of any open PR&Rs (i.e. Problem Resolution and Reporting).

If decision block 448 has determined that the problem has previously occurred, then the customer at process block 464 identifies the stored corrective actions taken with respect to that similar problem. If corrective actions are still in place and still being used within the factory environment as determined by decision block 468, then process block 452 is executed. However, if past corrective actions are not in place and not being used, then decision block 472 of the data destination remote site determines who has responsibility for the corrective action implementation. Decision block 472 bases this information chiefly upon the agreement data structure of the process control coordinator. If the customer has the responsibility, then at process block 476 the customer investigates the failure and reimplements or changes the corrective action plan. The customer at process block 476 uses the information contained within the technical database, as well as the information from the paint simulation computer program and the process control coordinator in order to investigate and correct the failure. If the factory has the responsibility for the corrective action as determined by the agreement data structure, then the data destination remote site notifies factory personnel at process block 480 so that the factory personnel can investigate the failure and report resolution to the customer at process block 484.

Figure 14:
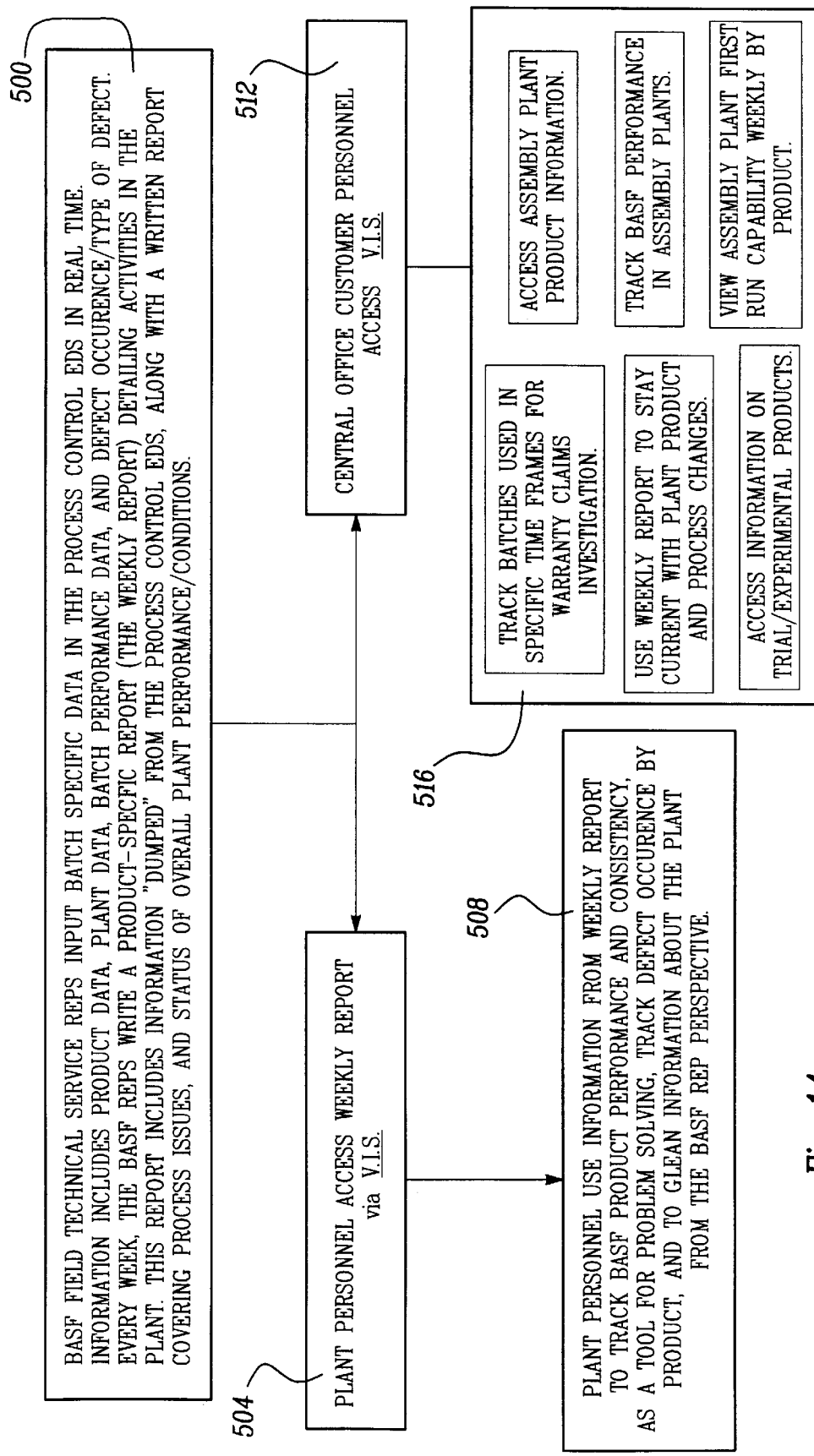
FIG. 14 is a flow chart depicting the steps for utilizing the system to form a weekly cause and effect analysis report.

FIG. 14 shows the steps involved in generating and utilizing automated weekly reports from the process control coordinator in order to analyze and control the operational parameters of the paint spraying system. At process block 500, factory technical service representatives input batch specific data into the process control coordinator data structures in real time. The batch specific data includes product data, plant data, batch performance data, and defect occurrence and type of defect. The process control coordinator generates a product-specific report that details the activities in the factory using information provided by the technical databases and the process control coordinator data structures.

At process block 504, plant personnel access the weekly report from the process control coordinator so that at process block 508 the plant personnel can use the information to track performance and consistency. This information is used for problem solving and to track defect occurrence by product. Moreover, the weekly report is automatically produced for customers at process block 512. The customer uses the automatic weekly report for such operational analyses as: tracking batches in specific time frames for warranty claims investigation; staying current with plant product and process changes; accessing information on trial and experimental products; accessing assembly plant product information; tracking factory performance in assembly plant; and viewing assembly plant first run capability weekly by product.

FIG. 15 illustrates a sample weekly report as provided by the present invention. Within the weekly report is shown what specifically occurred during what time frame for a specific paint. Such information can be used to detect problems with respect to a batch for a particular week or over several weeks.

Various other advantages of the present invention will become apparent to those skilled in the art after having the benefit of studying the foregoing text and drawings taken in conjunction with the following claims.

What is claimed is:

1. A computer-implemented apparatus for coordinating paint-related process steps of at least one paint-related facility, said paint-related process steps exhibiting paint-related characteristics, comprising:

a data acquisition module for acquiring paint characteristic data indicative of the paint-related characteristics;

a paint process control data structure for interrelating said acquired paint characteristic data with at least two of the paint-related process steps to produce interrelated paint process control data wherein each one of the paint-related process steps occurs at a plurality of paint-related facilities;

a paint process control coordinator connected to said data acquisition module for storing said acquired paint characteristic data in said paint process control data structure; and a data display connected to said paint process control data structure for remotely receiving and viewing said interrelated paint process control data.

2. The apparatus of claim 1 wherein said process control data structure being selected from the group consisting of a resin manufacturing data structure, a paint manufacturing data structure, paint application data structure, and combinations thereof.

3. The apparatus of claim 1 wherein said process control data structure includes at least two being selected from the group consisting of an equipment module data structure, a process module data structure, a material data structure, a quality forward data structure, a quality backward data structure, a people data structure, an economy data structure, an agreement data structure, and combinations thereof.

4. The apparatus of claim 3 wherein said process control data structure being selected from the group consisting of a resin manufacturing data structure, a paint manufacturing data structure, paint application data structure, and combinations thereof.

5. The apparatus of claim 4 further comprising:

a simplex calculator connected to said cooptimizer for constraining said permissible range of operational parameters.

6. The apparatus of claim 1 wherein said process control data structure includes at least one being selected from the group consisting of an equipment module data structure, a process module data structure, a material data structure, a quality forward data structure, a quality backward data structure, a people data structure, an economy data structure, an agreement data structure, and combinations thereof.

7. The apparatus of claim 1 wherein said paint characteristic data includes economic data related to the paint-related process steps.

8. The apparatus of claim 1 further comprising:

paint spraying equipment for spraying paint, said sprayed paint exhibiting sprayed paint characteristics;

a paint analyzer device for generating sprayed paint characteristic data based upon analyzing said sprayed paint characteristics, said paint process control data structure storing said sprayed paint characteristic data.

9. The apparatus of claim 8 further comprising:

a paint simulator for determining operational parameters for operating said paint spraying equipment.

10. The apparatus of claim 9 wherein said paint simulator determines said operational parameters based upon a design of experiments model involving at least one of the sprayed paint characteristics.

11. The apparatus of claim 9 further comprising:

a cooptimizer connected to said paint simulator for constraining the permissible range of said operational parameters of said paint spraying equipment.

12. The apparatus of claim 1 further comprising:

a plurality of data displays connected to said paint process control data structure for remotely receiving and viewing said interrelated paint process control data.

13. The apparatus of claim 12 further comprising:

a security database for providing security authorizations with respect to said plurality of data displays for remotely receiving and viewing said interrelated paint process control data.

14. A computer-implemented apparatus for coordinating paint-related process steps of at least one paint-related facility in order to spray paint via a paint spraying application process, said paint being manufactured from at least two components, said paint-related process steps exhibiting paint-related characteristics, comprising:

a data acquisition module for acquiring paint characteristic data indicative of the paint-related characteristics;

a paint process control data structure for interrelating said acquired paint characteristic data with at least two of the paint-related process steps to produce interrelated paint process control data, wherein at least one of the paint-related process steps is related to the paint spraying application process step, wherein at least one of the paint-related process steps is related to a paint manufacturing process step, said paint manufacturing process step being performed prior to the paint spraying application process step and being related to the manufacturing of the paint from the at least two components;

a paint process control coordinator connected to said data acquisition module for storing said acquired paint characteristic data in said paint process control data structure; and a data display connected to said paint process control data structure for remotely receiving and viewing said interrelated paint process control data.

* * * * *